US011668829B2

(12) United States Patent
Schoenlieb et al.

(10) Patent No.: US 11,668,829 B2
(45) Date of Patent: Jun. 6, 2023

(54) RESOLVING DISTANCE MEASUREMENT AMBIGUITIES USING CODED-MODULATION PHASE IMAGE FRAMES

(71) Applicant: Infineon Technologies AG, Neubiberg (DE)

(72) Inventors: Armin Schoenlieb, Seiersberg-Pirka (AT); Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1115 days.

(21) Appl. No.: 16/356,893

(22) Filed: Mar. 18, 2019

(65) Prior Publication Data

US 2020/0301014 A1 Sep. 24, 2020

(51) Int. Cl.
*G01S 17/89* (2020.01)
*G01S 7/48* (2006.01)
*G01S 17/36* (2006.01)

(52) U.S. Cl.
CPC .......... *G01S 17/89* (2013.01); *G01S 7/4808* (2013.01); *G01S 17/36* (2013.01)

(58) Field of Classification Search
None
See application file for complete search history.

(56) References Cited

U.S. PATENT DOCUMENTS 9,778,363 B2 10/2017 Kadambi et al.
10,260,858 B2* 4/2019 Martini ............... G01B 11/043
10,269,104 B2* 4/2019 Hannuksela ............ G06T 5/002
10,739,135 B2* 8/2020 Nakamura .............. G01S 7/497
2010/0153062 A1* 6/2010 Maltseff .................. G01S 17/36
702/159
2014/0313376 A1 10/2014 Van Nieuwenhove et al.
2014/0369623 A1* 12/2014 Fletcher .................... G06T 5/10
382/275

(Continued)

OTHER PUBLICATIONS

Plank, Hannes, et al., "Filtering Continous-Wave Time-of-Flight Measurements, Based on Coded Modulation Images", Unpublished U.S. Appl. No. 16/201,598, filed Nov. 27, 2018, 1-37.

*Primary Examiner* — Yuqing Xiao
*Assistant Examiner* — Jempson Noel
(74) *Attorney, Agent, or Firm* — Murphy, Bilak & Homiller, PLLC

(57) ABSTRACT

Distance ambiguities arising from indirect time-of-flight (ToF) measurements are resolved by using additional information from two or more coded-modulation measurements. An indirect ToF measurement is performed for a pixel of an image processor, to obtain a value indicative of an apparent distance to an imaged object or scene. First and second coded-modulation measurements are also performed, using respective combination of modulation code and reference signals, such that correlation peaks corresponding to these measurements overlap and cover respective first and second adjoining ranges of distances to imaged objects. First and second mask values are determined from the correlation values obtained from the coded-modulation measurements and are used to determine whether the value indicating the apparent distance indicates an actual distance within the first range of distances or within the second range of distances.

26 Claims, 9 Drawing Sheets

(56) References Cited

U.S. PATENT DOCUMENTS

2015/0120241 A1* 4/2015 Kadambi ............... G01S 17/32
  356/5.01
2016/0316112 A1* 10/2016 Tadano ................. G01S 17/32
2016/0327638 A1* 11/2016 Dielacher ............. G01S 17/36

* cited by examiner

RESOLVING DISTANCE MEASUREMENT AMBIGUITIES USING CODED-MODULATION PHASE IMAGE FRAMES

BACKGROUND

The present disclosure is generally related to image processing and is more particularly related to processing image data using information generated from coded-modulation time-of-flight measurements.

BACKGROUND

In optical sensing applications, depth measurements, i.e., measurements of the distance to various features of an object or objects in view of an image sensor may be performed as indirect time-of-flight (ToF) measurements, which are distance measurements determined using the speed of light and image/pixel sensors and that determine the distance to an imaged object or scene by determining a phase difference between modulated light illuminating the object or scene and reflected light received at the imaging sensor. The distance to an object of interest, which is a direct function of this phase, is typically calculated per pixel and, once calculated, can be used for depth detection, gesture identification, object detection, and the like. These distances can be combined to create a depth map and/or a three-dimensional (3D) point cloud, e.g., for 3D graphics rendering.

A number of approaches to indirect TOF measurement use so-called continuous-wave (CW) ToF measurements, which generally require multiple sequential exposures referred to as subframes, raw frames, phase images, or CW phase measurements. For each of these exposures, the light illuminating the object of interest is intensity-modulated by a periodic waveform such as a sinusoidal or pulsed waveform, with each pixel of the image sensor measuring a correlation of light reflected from the object of interest to a reference signal that is a copy of the modulating waveform. The phase difference between the reference signal and the waveform modulating the light is varied for each exposure. For example, one approach requires four separate exposures, such as 0°, 90°, 180° and 270°. Measurement information from the four exposures is collected and can be used to determine a depth map.

A well-known problem with CW ToF measurements is that the correlation function for the modulating waveform and the corresponding reference signal is itself a periodic waveform. This creates an ambiguity in the resulting CW phase measurements, as these phase measurements themselves do not provide any indication of which cycle of the periodic correlation waveform they result from. This phenomenon, which is often referred to as "phase wrapping," means that objects in the background of an object or objects of interest can reflect light that shows up as an unwanted response in the image, especially if the background object or objects are highly reflective.

A conventional solution to this problem is to make an additional phase set of measurements, i.e., to perform additional exposures, using a reference signal with a different frequency. Because an appropriately chosen frequency for this second reference signal will result in a different ambiguity distance, the measurements performed with the two different reference signal frequencies can be combined to resolve the ambiguity. Of course, this approach increases the number of measurements that are required, increasing data storage and processing power requirements for the imaging system.

Other approaches to indirect ToF measurements involve the use of modulation coding and may be referred to as coded ToF measurements or coded-modulation ToF measurements. With some of these approaches, the waveform used to intensity-modulate the emitted light and the reference signal used to demodulate the reflected light received at a pixel of an image sensor are chosen to have good autocorrelation properties, such that a correlation response with a significant amplitude is only present for a very narrow range of offsets between the modulating signal and the reference signal, relative to the period of the waveform. At other offsets, the amplitude of the correlation response is very low, or zero. Modulation and reference signals with these properties may be formed from well-known sequences such as m-sequences, Barker codes, or other pseudorandom sequences.

Compared to conventional CW ToF measurements, coded-modulation ToF measurements may be used to extend the ambiguity distance. However, to generate enough reflected energy at the imaging sensor to be reliably detected, coded-modulation ToF measurements generally use repetitions of the modulating code, so that the signal at the imaging sensor's pixels can be integrated over several periods of the modulation waveform. Thus, coded-modulation ToF measurements, like CW ToF measurements, also yield periodic correlation responses and thus also have problems with phase wrapping and distance ambiguities, even if the ambiguity distance is extended.

SUMMARY

Time-of-flight (TOF) systems and techniques addressing these needs are disclosed, whereby distance ambiguities arising from indirect ToF measurements, such as CW ToF measurements and other ToF measurements having periodic correlation responses, are resolved by using additional information from two or more coded-modulation measurements that use appropriately selected combinations of modulation code and reference signal. Using these techniques, distance measurement ambiguities can be resolved without performing, for example, an additional set of CW phase measurements.

An example method for performing depth measurements with an image sensor according to the presently disclosed techniques includes several steps performed for each of at least one pixel. The method includes the step of performing an indirect time-of-flight measurement using the pixel, to obtain a value indicative of an apparent distance to an imaged object or scene. The method further includes the step of performing a first coded-modulation measurement for the pixel, to obtain a first correlation value, using a first combination of modulation code and reference signal selected to yield a first correlation response with a peak extending over a first range of distances to imaged objects. This first range of distances may cover, for example, a range of distances that extends to the maximum distance that can be unambiguously measured with a CW ToF measurement.

The method further comprises performing a second coded-modulation measurement for the pixel, to obtain a second correlation value, using a second combination of modulation code and reference signal selected to yield a second correlation response with a peak extending over at least a second range of distances to imaged objects. This second range of distances abuts the first range of distances, and the correlation peak for the second combination of modulation code and reference signal overlaps the correlation peak for the first code in an overlap region consisting of a portion of the first range of distances and an adjoining portion of the second range of distances. Thus, for example, this second range of distances may extend from the maximum distance that can be unambiguously measured with the CW phase measurements to twice that distance, with the correlation peak for the second combination of modulation code and reference signal covering that second range and overlapping a portion of the first range.

The method still further comprises determining a first mask value for the pixel by comparing the first correlation value to a first threshold and determining a second mask value for the pixel by comparing the second correlation value to a second threshold. Finally, the method comprises resolving distance ambiguity in the value indicative of the apparent distance by determining, based on the first and second mask value values, whether the value indicative of the apparent distance indicates an actual distance within the first range of distances or within the second range of distances.

Corresponding image processing systems are also disclosed. One such system includes a sensor comprising a plurality of pixels configured to generate a respective plurality of pixel signal values in response to received light, where each pixel is configured to obtain its respective pixel signal value by demodulating received light using a reference signal. This system further includes a reference signal generator configured to generate a reference signal and to provide the reference signal to the plurality of pixels, and a control circuitry configured to control the reference signal generator and the plurality of pixels to, for each of at least one pixel, perform an indirect time-of-flight measurement using the pixel, to obtain a value indicative of an apparent distance to an imaged object or scene, and perform a first coded-modulation measurement for the pixel to obtain a first correlation value, using a first combination of modulation code and reference signal selected to yield a first correlation response with a peak extending over a first range of distances to imaged objects. The control circuitry is further configured to control the reference signal generator and the plurality of pixels to perform a second coded-modulation measurement for the pixel to obtain a second correlation value, using a second combination of modulation code and reference signal selected to yield a second correlation response with a peak extending over at least a second range of distances to imaged objects, the second range of distances abutting the first range of distances, wherein the correlation peak for the second modulation code overlaps the correlation peak for the first code in an overlap region consisting of a portion of the first range of distances and an adjoining portion of the second range of distances. The control circuitry is further configured to determine a first mask value for the pixel by comparing the first correlation value to a first threshold and determine a second mask value for the pixel by comparing the second correlation value to a second threshold, and is still further configured to resolve distance ambiguity in the value indicative of the apparent distance by determining, based on the first and second mask value values, whether the value indicative of the apparent distance corresponds to an actual distance within the first range of distances or within the second range of distances.

The techniques and apparatus described herein may be used to efficiently obtain distance measurements, such as in a depth map, without ambiguity due to phase wrapping. These techniques may also be used to selectively filter image data to limit the data to images of objects falling within a predetermined range of distances from the image sensor.

Variants of the above techniques and apparatuses and further advantages are discussed in the detailed description that follows.

DETAILED DESCRIPTION

Figure 1:
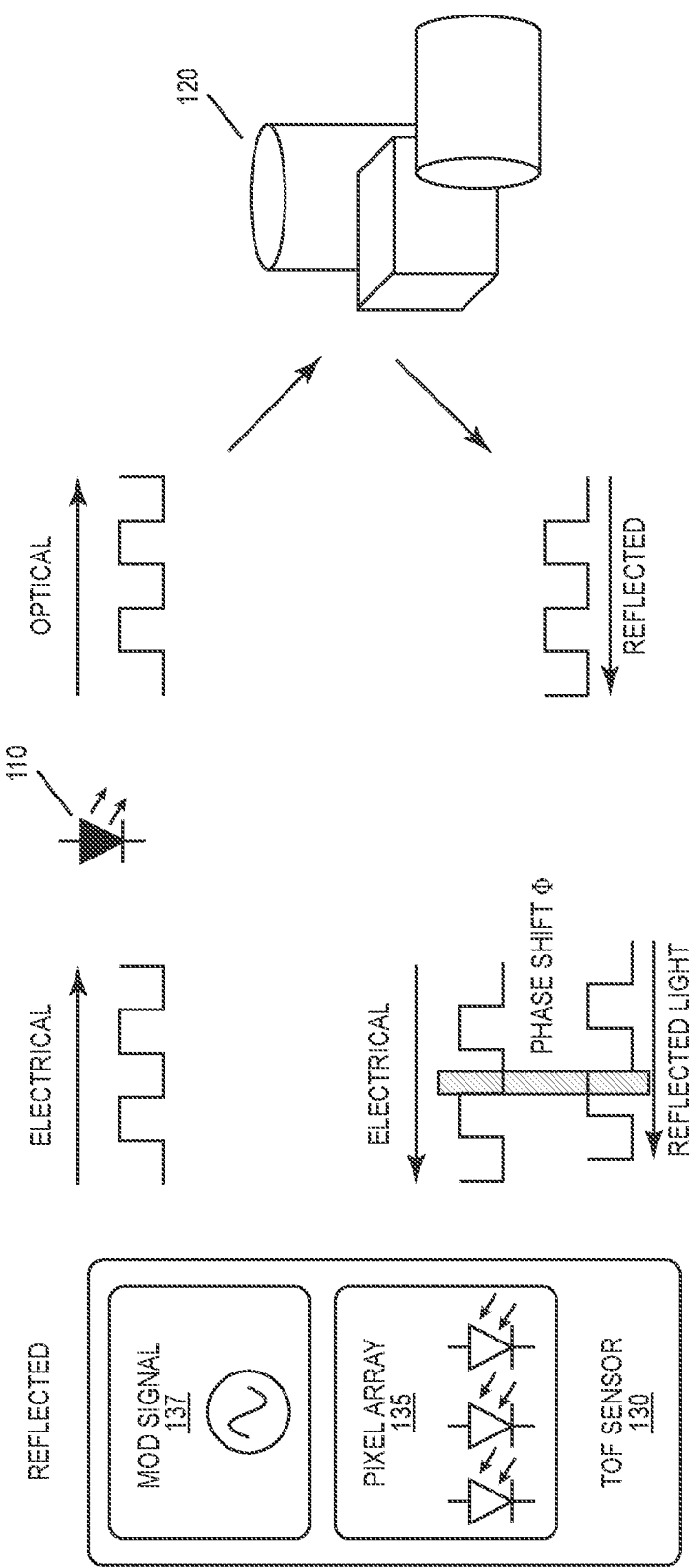
FIG. 1 is a diagram illustrating the principles of time-of-flight measurement according to some of the embodiments described herein.

The present invention will now be described with reference to the attached drawing figures, wherein like reference numerals are used to refer to like elements throughout, and wherein the illustrated structures and devices are not necessarily drawn to scale. In this disclosure, the terms "image" and "image sensor" are not limited to images or sensors involving visible light but encompass the use of visible light and other electromagnetic radiation. Thus, the term "light" as used herein is meant broadly and refers to visible light as well as infrared and ultraviolet radiation.

FIG. 1 illustrates the basic principles of continuous-wave (CW) time-of-flight (TOF) phase measurements, which are a well-known approach to performing indirect ToF measurements. A light source 110, such as a light-emitting diode (LED) or vertical-cavity surface-emitting laser (VCSEL), is modulated with an electrical signal (e.g., a radio-frequency sinusoid at, for example, 300 MHz), so that the light source 110 emits an amplitude-modulated optical signal towards the target scene 120. Traveling at the speed of light c, the light signal reflects from an object or objects in the scene 120 and arrives back at a pixel array 135 in the TOF sensor 130, with the time of flight to the target scene 120 and back imposing a phase shift of ∅ on the optical signal as received at the pixel array 135, relative to the originally transmitted optical signal.

The modulation signal 137 used to modulate the emitted light, or a phase-shifted version of it, is also supplied as a reference signal to the pixels in pixel array 135, to be correlated with the modulation signal superimposed on the reflected optical signal—in effect, the reflected optical signal is demodulated by each pixel in the pixel array 135.

Figure 2:
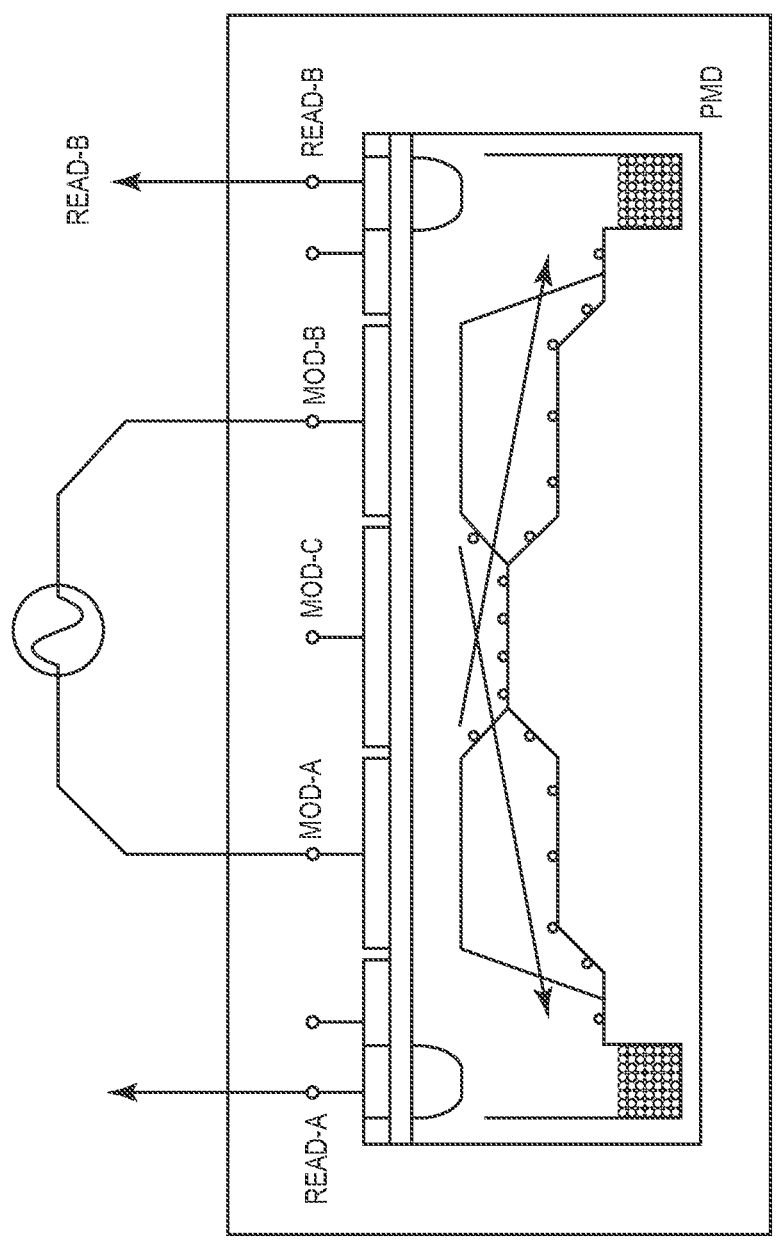
FIG. 2 illustrates an example photonic mixing device (PMD).

While the structure and design of light-sensing pixels may vary, each of the pixels in pixel array 135 may in some instances be a photon mixing device, or PMD. FIG. 2 illustrates the basic structure of an example PMD, which includes readout diodes A and B and modulation gates A and B. A reference signal is applied differentially across the modulation gates A and B, creating a gradient in electric potential across the p-substrate, while incoming light is received at a photo gate/diode. A differential sensor signal is generated across the readout diodes A and B. The sensor signal from a pixel may be integrated for a period of time to determine phase measurement information.

The difference between voltages at the Read-A and Read-B nodes of the PMD corresponds to the correlation between the modulated optical signal detected by the photosensitive diode structures in the illustrated device and the reference signal, which is applied between the Mod-A and Mod-B nodes of the device. Thus, the PMD (and other light-sensitive pixel structures) demodulate the modulated optical signal reflected from the target scene 120, producing a pixel signal value (in this case the difference between voltages at Read-A and Read-B) indicative of the distance traveled by the reflected optical signal, as discussed in further detail below.

While the modulation signal may take any of a variety of forms, the principle behind this correlation/demodulation is most easily seen with a sinusoidal signal as a modulation signal. If the modulation signal g(t) and the received signal s(t) with modulation amplitude 'a' and phase shift '∅' are given as:

$$m(t) = \cos(\omega t), \text{ and}$$

$$s(t) = 1 + (a \times \cos(\omega t + \emptyset)),$$

then the correlation of the received signal with the reference signal gives:

$$r(\tau) = \left(\frac{a}{2}\right)\cos(\emptyset + w\tau),$$

which is a function of the phase difference ∅ between the two signals. It will be appreciated that with a periodic modulation signal, this correlation can be carried out for an extended period of time, e.g., several cycles of the modulating signal, to improve the signal-to-noise ratio of the resulting measurement.

Figure 3:
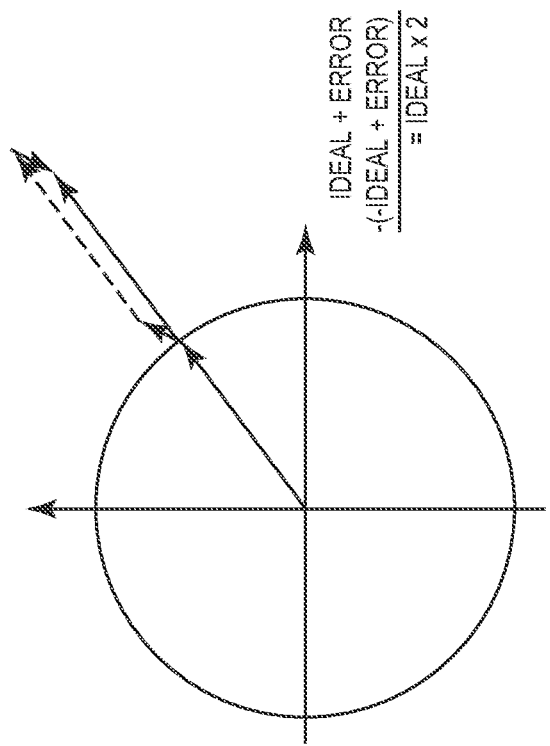
FIG. 3 is a diagram illustrating principles of phase measurement according to time-of-flight (TOF) techniques.
Figure 3:
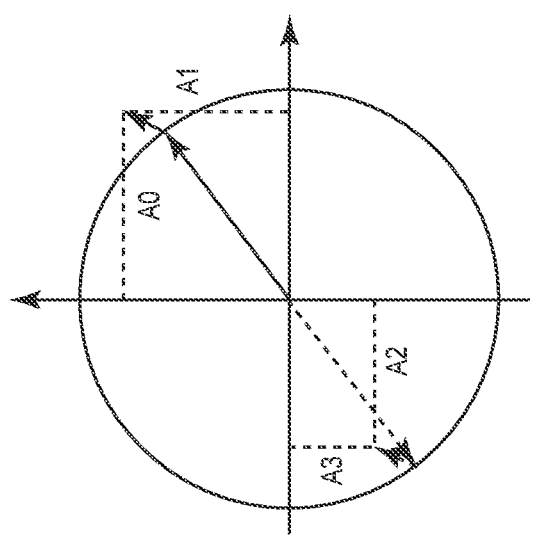

The phase difference between the emitted optical signal and the received reflection of that signal, which is proportional to the distance traveled by the optical signal, can be extracted by an N-phase shifting technique. This requires sampling the correlation function at N different points, e.g., by performing correlations using N different phase shifts of the reference signal, with respect to the modulating signal g(t). At least two measurements are required to calculate this phase shift, and hence to determine the distance traveled. This is often done using four different phase shifts, e.g., at 0, 90, 180, and 270 degrees, as this allows for a simple cancellation of systematic offsets in the correlation results. This is seen in FIG. 3, which shows how the correlations A0 and A1, at 0 and 90 degrees, respectively, correspond to a first phase vector having an "ideal" component corresponding to the actual difference traveled by the optical signal and a systematic component reflecting systematic error in the measurements and readout. Likewise, the correlations A2 and A3, at 180 and 270 degrees, respectively, correspond to a second phase vector pointing in the opposite direction, with an exactly opposite "ideal" component and an identical systematic component. In the figure, the ideal components are represented by the vectors extending from the origin to the circle, while the systematic error components are represented by the smaller vectors. The actual phase ∅ can then be calculated as follows:

$$\emptyset = \arctan\left(\frac{A1 - A3}{A2 - A0}\right).$$

From this phase, an apparent distance, or "depth" to the target scene 120 can be calculated as follows:

$$D = \frac{c \times \emptyset}{4\pi f_{mod}},$$

where $f_{mod}$ is the frequency of the modulating signal.

Figure 4:
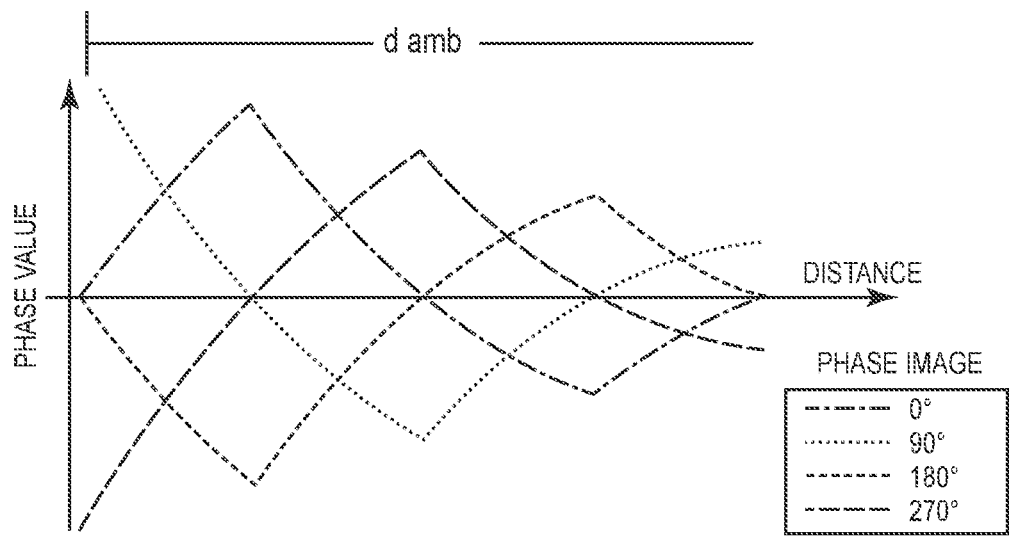
FIG. 4 illustrates a correlation function for time-of-flight phase measurements.

It should be immediately appreciated that this distance calculation has an ambiguous result, such that it is not possible to tell from a single distance calculation exactly which of several possible distances could have yielded the calculated phase. It is for this reason that this distance is referred to herein as an "apparent distance." As the imaged object gets further away from the light source, the measured phase increases from 0° to 360°, but then repeats after a certain distance, as can be seen in FIG. 4. In effect, there is an aliasing effect, which can cause objects further away than this certain distance to be folded back into the first region (See FIG. 2). Put differently, because the correlation response has a strong periodic component, several different values of D can yield the same phase measurement result. This phenomenon is sometimes called "phase wrapping."

The distance from the optical light source at which this phase wrapping first begins to occur is called the ambiguity distance, which is defined as $$d_{amb} = \frac{c}{2 f_{mod}}.$$

This ambiguity distance is one-half the free-space wavelength of the modulating signal, and thus is shorter for higher modulation frequencies. Thus, for example, the ambiguity distance for an 80 MHz modulating signal is about 1.9 meters.

The significance of this phase wrapping can be seen in FIG. 4, which shows an example of phase measurement results for CW TOF phase measurements, as a function of distance. As can be appreciated from the figure, although the amplitude of the correlation attenuates as the distance increases, it is not possible, without additional information, to distinguish between a signal reflected from an object at a distance of x and a signal reflected from an object with somewhat higher higher reflectivity, at a distance of $x+d_{amb}$. Put differently, the ambiguity distance $d_{amb}$ is the width of the region in which every correlation value is unique— extending beyond this region results in duplicated correlation values.

Figure 5:
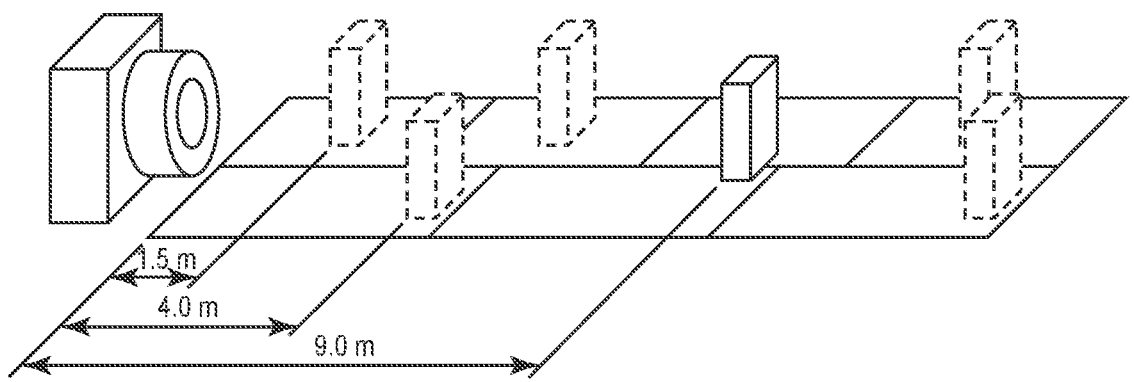
FIG. 5 illustrates phase unwrapping using two different modulation frequencies for phase measurements.

Various techniques for resolving this ambiguity are known. One approach is to incorporate amplitude information obtained from the reflected optical signal into the distance determination. Another approach is to repeat the measurement with a different modulating frequency, which results in a different ambiguity distance. The results of this second measurement can be combined with the first to resolve the ambiguity, as the measurements should provide coinciding results for only a single distance. This can be seen in FIG. 5, which illustrates the use of two sets of phase measurements, with different modulation frequencies. In this example, one set of measurements uses a modulation frequency that yields an ambiguity distance of 3.75 meters, while the other uses a modulation frequency yielding an ambiguity distance of 5.0 meters. An imaged object that is at 9 meters away is further away than either of these ambiguity distances As seen in the figure, the first set of measurements indicates an apparent distance of 1.5 meters. If only this first set of measurements is considered, it is not possible to tell whether the imaged object is actually at 1.5 meters, 5.25 meters, 9.0 meters, or 12.75 meters. Likewise, if only the second set of measurements is considered it is not possible to tell whether the imaged object is at 4.0 meters (the apparent distance indicated by the second set of measurements), 9.0 meters, or 13.0 meters. However, the first possible distance that is common to these two measurements is 9.0 meters—thus, the possibilities of 1.5 meters, 4.0 meters, 5.25 meters, and 13.0 meters can be ruled out.

Thus, it can be seen that using two sets of phase measurements, with different modulation frequencies, can increase the ambiguity distance well beyond the ambiguity distance that would apply if either set of phase measurements was used alone. However, this approach doubles the power consumption, compared to a single set of exposures, can create motion artifacts, due to the additional time needed to complete the measurements, and requires significantly more computation.

Figure 6:
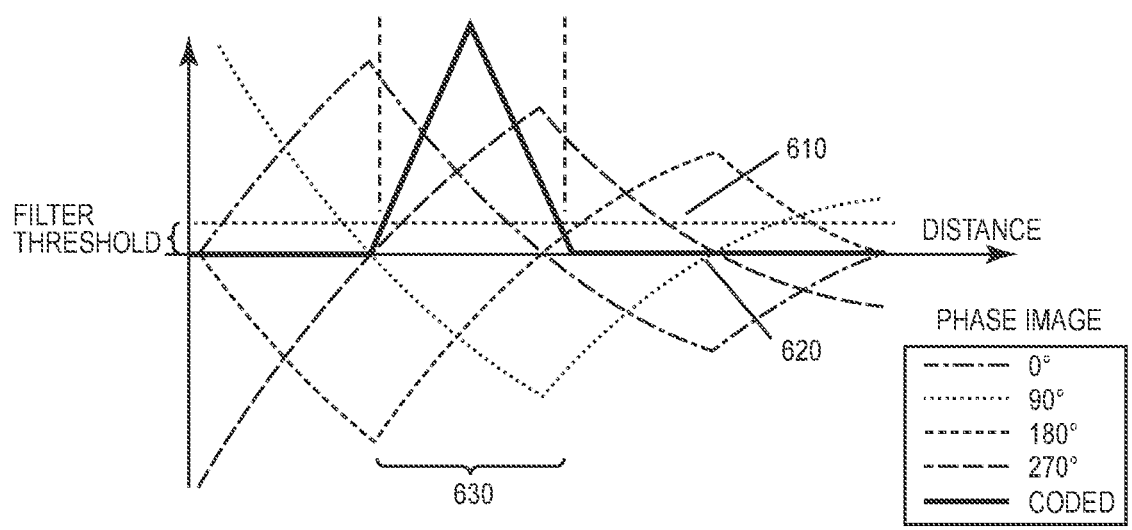
FIG. 6 illustrates a correlation function for an example coded-modulation measurement.

Sensing distances with coded modulation is another approach that can be used to reduce distance ambiguity problems, by extending the ambiguity distance. With modulation coding, the modulating waveform applied to the emitted light and the pixel reference signal (which is used by the TOF pixels to measure a correlation with the received signal reflected from the object of interest) are adapted in such a way that the autocorrelation function is cut-off over certain distances. An example of this is depicted in FIG. 6. In this figure, the bolded line 620 represents a correlation measurement at a ToF pixel, as a function of distance, for an example coded-modulation measurement. As can be seen in the figure, the function has a single peak over the illustrated range of distances, and yields significant amplitudes (i.e., exceeding the threshold 610) over only a limited range of distances within this overall range. Results of this kind can be achieved with modulation signals (and corresponding reference signals) that amplitude-modulate the optical signal with m-sequences, for example, although other code-modulation signals are known and have been discussed. Note that while FIG. 6 illustrates a correlation response having positive values for the correlation at the peak, some implementations and/or combinations of modulation signal and reference signal can produce correlation responses having negative-valued peak. When a PMD like that shown in FIG. 2 is used, for example, a negative-valued or positive-valued peak can be arbitrarily selected simply by choosing whether to subtract Read-A from Read-B or the reverse.

Using only coded-modulation measurements to calculate distance images comes with some disadvantages. These measurements can require significantly more energy per measurement and can result in poorer depth resolution than CW ToF measurements. If the same signal strength as in conventional continuous wave ToF is desired, the exposure time needs to be increased. This might not be possible in some scenarios, however, due to eye-safety regulations.

An advantage of coded modulation is that it has a correlation peak that extends over a limited range of distance, while providing very low correlation values over extended distances. This can be seen clearly in FIG. 7, which illustrates an ideal correlation response for a pseudorandom binary sequence having a bit (or "chip") length of Tc and an overall length of L bits. As seen in the Figure, the peak has a maximum magnitude that is proportional to L and is tightly constrained to a range with a width of 2*Tc. Between peaks, the correlation value has a magnitude that is proportional to 1/L.

Figure 7:
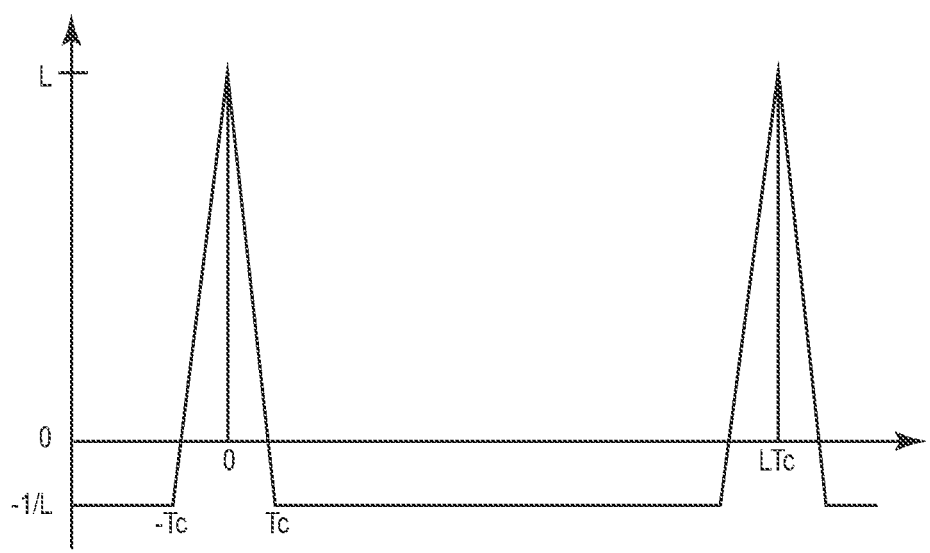
FIG. 7 illustrates a correlation function for a pseudo-random binary sequence.

In FIG. 7, the correlation response has peaks at distances of 0 and L*Tc. By cyclically shifting the reference signal relative to the modulation waveform, the peak can be arbitrarily positioned at any point between these distances. Note that the correlation response is periodic, but because these peaks are widely spaced, e.g., as compared to the periodic nature of the correlation response with a conventional CW ToF flight measurement, the ambiguity distance can be quite long. Thus, for example, if a Barker-11 code is used for the coded-modulation measurement, at a bit rate of 80 MHz, the ambiguity distance is 20 meters. Note that Barker codes are one example of a pseudorandom sequence that can be used for coded-modulation measurements. The same Barker code used to modulate the emitted light, or a shifted version of it, may be used for the reference signal applied to the pixels to demodulate the light reflected from the target or scene of interest. Other sequences, such as m-sequences, and other combinations of modulation signal and reference signal can be used as well.

While a coded-modulation measurement can have a very long ambiguity distance compared to other indirect ToF measurements, including those based on CW ToF phase measurements as discussed above, the performance of the coded-modulation measurement can be inferior to the performance of a measurement using a conventional CW ToF phase approach, in particular in terms of emitted optical power. Coded-modulation measurements can be advantageously combined with CW ToF phase measurements or other indirect ToF measurements, however, to improve the ambiguity distance normally obtainable from the latter, without requiring, for example, the use of two distinct sets of CW phase measurements with different modulation frequencies. Detailed techniques according to this general approach are described below with reference to CW ToF measurements. It should be understood, however, that these techniques, whereby coded-modulation measurements are combined with an indirect ToF measurement to resolve distance ambiguities, may be applied to indirect ToF measurements other than CW ToF measurements.

Figure 8:
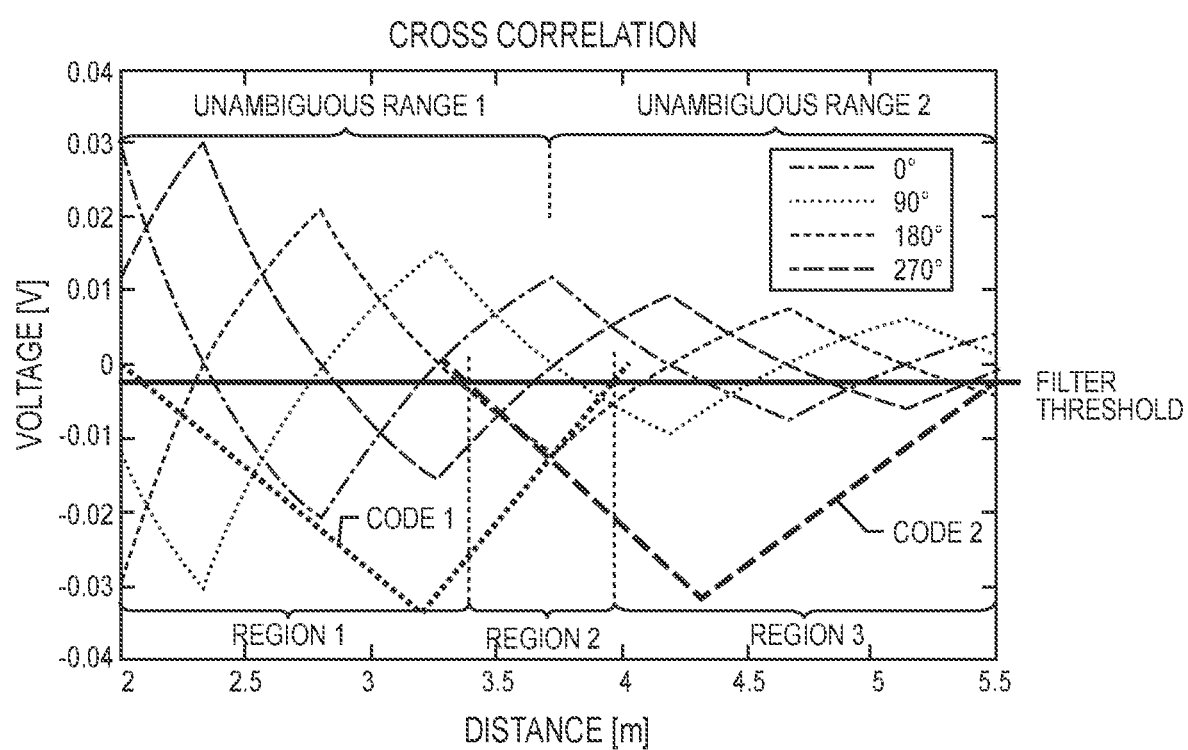
FIG. 8 illustrates correlation responses for conventional 4-phase CW ToF phase measurements superimposed with correlation responses for two coded-modulation measurements, using two different combinations of modulation code and reference signal.

FIG. 8 illustrates correlation responses for conventional 4-phase CW ToF phase measurements superimposed with correlation responses for two coded-modulation measurements, using two different combinations of modulation code and reference signal. The correlation responses for the coded-modulation measurements in this example have negative-valued peaks and are indicated in the figure as corresponding to "code 1" and "code 2."

These first and second codes, or, more precisely, the first and second combinations of modulating waveform and reference signal are selected to provide correlation peaks that cover distinct but overlapping ranges of distances. It will be appreciated that these could use different codes, e.g., different pseudorandom sequences, or cyclically shifted versions of the same code, in various embodiments.

As seen in the figure, "code 1" yields a correlation peak that extends from roughly 2.0 meters to 4.0 meters. A useful portion of this correlation peak can be delimited by a filter threshold 810, as seen in the figure. Code 2," on the other hand, has a correlation peak that extends from approximately 3.3 meters to about 5.6 meters. A useful portion of this second correlation peak can also be delimited by a filter threshold 810; in practice, different thresholds could be used.

In the illustrated example, the CW ToF measurements yield periodic correlation responses that yield an ambiguity distance of about 1.875 meters (corresponding to a modulation frequency of 80 MHz). Thus, distances between 1.875 to 3.75 meters can't be distinguished from distances between 0 to 1.875 meters or from distances between 3.75 meters and 5.625 meters. Each of these ranges can be considered a distinct "unambiguous range." The figure shows portions of these ranges, labeled "unambiguous range 1" and "unambiguous range 2," respectively, with the dividing line at about 3.75 meters indicating the point at which the phase measurements roll over. Code 1 and Code 2 are selected so that each of their respective correlation peaks extends over most, if not all, of a respective one of these unambiguous ranges. As explained in further detail below, these coded-modulation correlation responses can be used to determine whether the results of CW ToF measurements indicate an object present in the first unambiguous range or the second unambiguous range.

An example of how this disambiguation can be performed is as follows. First, an indirect ToF measurement is performed for at least one pixel, e.g., for each pixel of an image sensor, to obtain a value indicative of an apparent distance to an imaged object to the scene for the pixel. For instance, a conventional four-phase depth measurement, as was described above, can be performed. While these measurements can be used to calculate an apparent distance (or depth map) to the imaged object or scene, this apparent distance is subject to ambiguity. For example, it may be impossible to tell, from these measurements alone, whether the imaged object is at 2.4 meters from the imaging apparatus or at 4.275 meters, as the phase measurements for both would be similar.

Next, two coded-modulation measurements are performed, using two different combinations of modulation signal and reference signal, with corresponding correlation peaks that cover two different, but overlapping ranges, as shown in FIG. 8. Note that while these measurements are described here as being performed after the indirect ToF measurement that produces the value indicative of the apparent distance, these measurements can be performed in any order.

As noted above, a depth, or apparent distance, can be calculated from the conventional four-phase measurements. Note that an apparent distance is not necessarily calculated—some other value may be indicative of this apparent distance. For instance, given a certain ambiguity distance, a phase value (ranging from zero to 360 degrees) obtained by combining the results of multiple CW phase measurements is indicative of the apparent distance, with 90 degrees indicating an apparent distance of one-fourth the ambiguity distance, 180 degrees indicating an apparent distance of one-half the ambiguity distance, and so on.

For the phase unwrapping, i.e., to resolve ambiguity in a calculated apparent distance or some other value indicative of the apparent distance, a filter mask is applied to each of the coded-modulation measurements (alternatively called "coded-modulation frames," when a pixel array is used). This can be done by simply comparing the correlation value obtained from each measurement to a threshold. For coded-modulation measurements having negative-going peaks like those shown in FIG. 8, the correlation values are compared to a threshold with a negative threshold—values lower than the threshold are set to 1, for example, while values higher than the threshold are set to 0:

$$F(i, y) = \begin{cases} 0 & \text{if}(Q_{code} > \text{threshold}), \\ 1 & \text{if}(Q_{code} < \text{threshold}) \end{cases}.$$

This is performed for both of the coded-modulation measurements, using the same or a different threshold. Thus, for each pixel, a first mask value F1 indicates whether the correlation with code 1 falls within the peak of code 1's correlation response, and a second mask value F2 indicates whether the correlation with code 2 falls within the peak of code 2's correlation response. These two mask values can be used directly to determine whether the value indicated by the apparent distance obtained from the indirect ToF measurement indicates an object in "Region 1" or "Region 2" of the range in FIG. 8. Note that Region 1 and Region 2 extend across part (but not all) of unambiguous range 1 and adjoining unambiguous range 2, respectively; Region 2 lies between Region 1 and Region 3 and includes a portion of both unambiguous range 1 and unambiguous 2. The limits of Region 2 are defined by the points at which the correlation peaks for code 1 and code 2 cross the filter threshold.

Determining that the value indicative of the apparent distance should be mapped to either Region 1 or Region 2 can be done using only the mask values discussed above. In short, the apparent distance indicated by the indirect ToF measurement necessarily falls in Region 1 if F1=1, while F2=0. Likewise, the apparent distance indicated by the CW phase measurements necessarily falls in Region 3 if F1=0 and F2=1. If either of these is satisfied, then ambiguity in the value indicative of the apparent distance, since the former case maps the apparent distance to unambiguous range 1 while the latter maps the apparent distance to unambiguous range 2. This can be expressed as follows:

$$\text{Depth}(i, y) = \begin{cases} u1 & \text{if } (F1(i, y) = 1) \text{ and } (F2(i, y) < 1), \\ u2 & \text{if } (F2(i, y) = 1) \text{ and } (F1(i, y) < 1) \end{cases},$$

which says that the apparent distance value obtained from the indirect ToF measurement is mapped to the first range of distances, i.e., unambiguous region 1, in the event that the first mask value indicates that the first correlation value is below the first threshold and the second mask value indicates that the second correlation value is above the second threshold, while the apparent distance value is mapped to the second range of distances, i.e., unambiguous region 2, in the event that the first mask value indicates that the first correlation value is above the first threshold and the second mask value indicates that the second correlation value is below the second threshold.

Again, the term "apparent distance" is used here to indicate that a distance calculated from an indirect ToF measurement (e.g., using the CW phase measurements described above) is ambiguous, as it is subject to the phase-wrapping distance phenomenon described above.

This apparent distance will always indicate a distance in the first unambiguous range—thus, it may be the same as or different from the actual distance to the imaged object or scene.

Note also that the formulation given above assumes negative-valued correlation peaks. If the opposite is true, i.e., if the correlation peaks (and the corresponding thresholds) are positive, then the value indicative of the apparent distance, as obtained from the indirect ToF measurement, is mapped to the first range of distances, i.e., unambiguous region 1, in the event that the first mask value indicates that the first correlation value is above the first threshold and the second mask value indicates that the second correlation value is below the second threshold, while the value indicative of the apparent distance is mapped to the second range of distances, i.e., unambiguous region 2, in the event that the first mask value indicates that the first correlation value is below the first threshold and the second mask value indicates that the second correlation value is above the second threshold.

Determining how a CW phase measurement should be mapped to the first and second unambiguous ranges when the results of the coded-modulation measurements fall in Region 2 requires additional evaluation. Region 2 defines the range where the magnitudes of the correlation values from both coded-modulation measurements exceed the magnitudes of their respective threshold values; thus, neither of the mappings described immediately above apply. Two different approaches are possible; these could be combined, as well.

A first approach is based on the amplitudes of the coded-modulation measurements. Given that the correlation values for both coded-modulation measurements have magnitudes exceeding those of their respective thresholds, then if the correlation value from the first coded-modulation measurement is lower than the correlation value from the second coded-modulation measurement, then the value indicative of the apparent distance is mapped to the first unambiguous range. Otherwise, i.e., if the correlation value from the first coded-modulation measurement is greater than the correlation value from the second coded-modulation measurement, then the value indicative of the apparent distance is mapped to the second unambiguous range. This can be represented as:

$$\text{Depth}(i, y) = \begin{cases} u1 & \text{if}((Q(\text{code1}) < Q(\text{code2})), \\ u2 & \text{if}((Q(\text{code1}) > Q(\text{code2})) \end{cases}.$$

Again, it should be noted that this formulation assumes negative-valued correlation peaks. If the correlation peaks are instead positive-valued, then the inequalities in the previous formulation should be reversed. More generally, it should be appreciated that, given that the correlation values for both coded-modulation measurements have magnitudes exceeding those of their respective thresholds, then if the magnitude of the correlation value from the first coded-modulation measurement is greater than the magnitude of the correlation value from the second coded-modulation measurement, then the value indicative of the apparent distance is mapped to the first unambiguous range. Otherwise, i.e., if the magnitude of the correlation value from the first coded-modulation measurement is greater than the magnitude of the correlation value from the second coded-modulation measurement, then the value indicative of the apparent distance is mapped to the second unambiguous range.

Stated differently, according to this first approach, determining whether the value indicative of the apparent distance, as calculated from an indirect ToF measurement, indicates an actual distance within the first range of distances or within the second range of distances comprises, in the event that the first and second mask values indicate that the first and second correlation values both have magnitudes above the respective magnitudes of the first and second thresholds: assigning the value indicative of the apparent distance to the first range of actual distances in the further event that the first correlation value has a magnitude greater than the magnitude of the second correlation value; and otherwise assigning the value indicative of the apparent distance to the second range of actual distances in the further event that the second correlation value has a magnitude greater than the magnitude of the second correlation value. Note that if the correlation values are equal (and both have magnitudes greater than the magnitudes of their corresponding thresholds), then the value indictive of the apparent distance can be mapped to either the first or second unambiguous range, as this situation indicates that the actual distance is at the point where these two ranges meet.

Another approach to handle the mapping of apparent distances to unambiguous ranges when the coded-modulation measurements fall within Region 2 is to use the phase value obtained from a CW ToF measurements. Because Region 2 covers part of the right-most end of the first unambiguous range, the phase obtained from the CW ToF measurement for an actual distance falling both in Region 2 and in the first unambiguous range should be between 180° and 360°. Conversely, because Region 2 covers part of the left-most end of the second unambiguous range, the phase obtained from the CW ToF measurement for an actual distance falling both in Region 2 and in the second unambiguous range should be between 0° and 180°. As noted above, this approach could be combined with the approach discussed above, e.g., according to:

$$\text{Depth}(i, y) = \begin{cases} u1 & \text{if}(Q(\text{code1}) < Q(\text{code2}))\text{and}(180° < \varphi < 360°), \\ u2 & \text{if}(Q(\text{code1}) > Q(\text{code2}))\text{and}(0° < \varphi < 180°) \end{cases}.$$

Note that if the phase measurement has a value of 180° (and both coded-modulation measurements have magnitudes greater than the magnitudes of their corresponding thresholds), then the value indicative of the apparent distance can be mapped to either the first or second unambiguous range, as this situation indicates that the measured distance is at the point where these two ranges meet.

Figure 9:
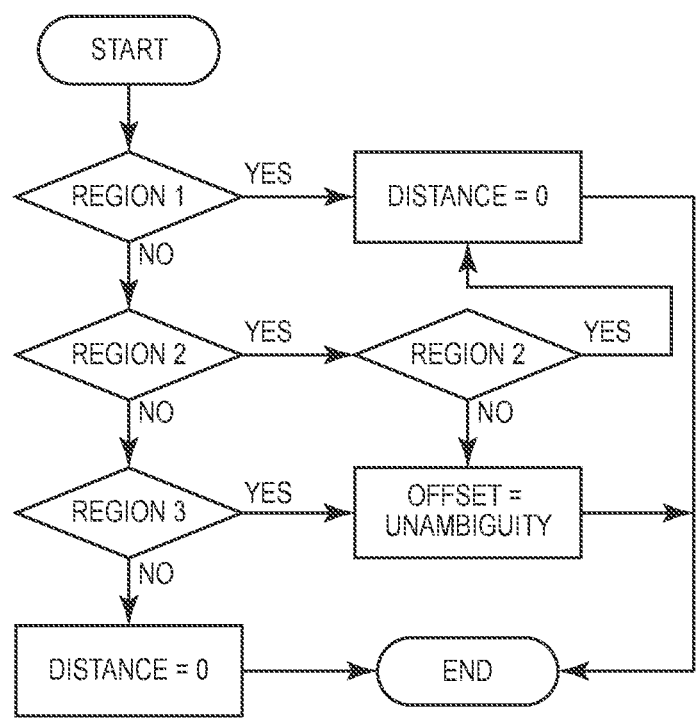
FIG. 9 is a flow chart illustrating a mapping of apparent distance to first and second unambiguous distance ranges, using offsets.

FIG. 9 is a flow chart showing how to apply the mapping from Regions 1, 2, and 3 to the unambiguous range 1 and 2. If the tests above indicate that the apparent distance indicated by the indirect ToF measurement falls in Region 1, then the distance is mapped to the first unambiguous range. This means that an apparent distance calculated from the indirect ToF measurement can be used as is, i.e., with an offset of zero, as indicated in the figure. If the tests indicate that the apparent distance falls into Region 2, however, then an additional test is needed. In the example given in the figure, this example test is a phase-based test—if the phase is between than 180 and 360 degrees, i.e., less than zero, then the apparent distance is mapped to the first unambiguous range, again meaning that a calculated apparent distance with an offset of zero can be used as the actual distance.

If this phase-based test indicates that the apparent distance falls in the other half of Region 2, however, or if the tests above indicate that the apparent distance obtained from the CW phase measurements falls in Region 3, then the apparent distance is mapped to the second unambiguous range. In this case, an offset equal to the ambiguity distance of the indirect ToF measurement can be applied to an apparent distance calculated from the indirect ToF measurement, to effectively "unwrap" the ambiguous measurement.

If only two coded-modulation measurements are used, as discussed above and as illustrated in FIGS. 8 and 9, then CW phase measurements that map to actual distances further away than Region 3 are filtered. This prevents these measurements from producing an erroneous depth in a depth map, for example. If only the normal CW phase measurements were used, these measurements would have folded into the first unambiguous range (as well as any measurements for objects falling into the second unambiguous range).

It should be appreciated that additional code measurements can be used as well, to extend the effective range of the disambiguation. Thus, for example a third code-modulation measurement, having a correlation response that spans a third unambiguous range, abutting the second, can be performed, allowing for the mapping of apparent distances to any of the first, second, and third unambiguous regions using straightforward extensions to the techniques described above.

More particularly, if the tests described above indicate that the apparent distance should be mapped to the first unambiguous region, then no further testing is needed. If these tests indicate that the apparent distance is in neither the first unambiguous range nor the second unambiguous range, then additional tests like those described above can be carried out, but for the second and third coded-modulation measurements, to determine whether the apparent distance should be mapped to the third unambiguous range, abutting the second. If the apparent distance should be mapped to the third unambiguous range, then an offset equal to twice the ambiguity distance of the CW phase measurements should be added to the apparent distance.

If the tests indicate that the apparent distance falls in none of Regions 1, 2, or 3, then this distance measurement can be filtered out, e.g., by giving it a value of zero, as shown in the figure.

Figure 10:
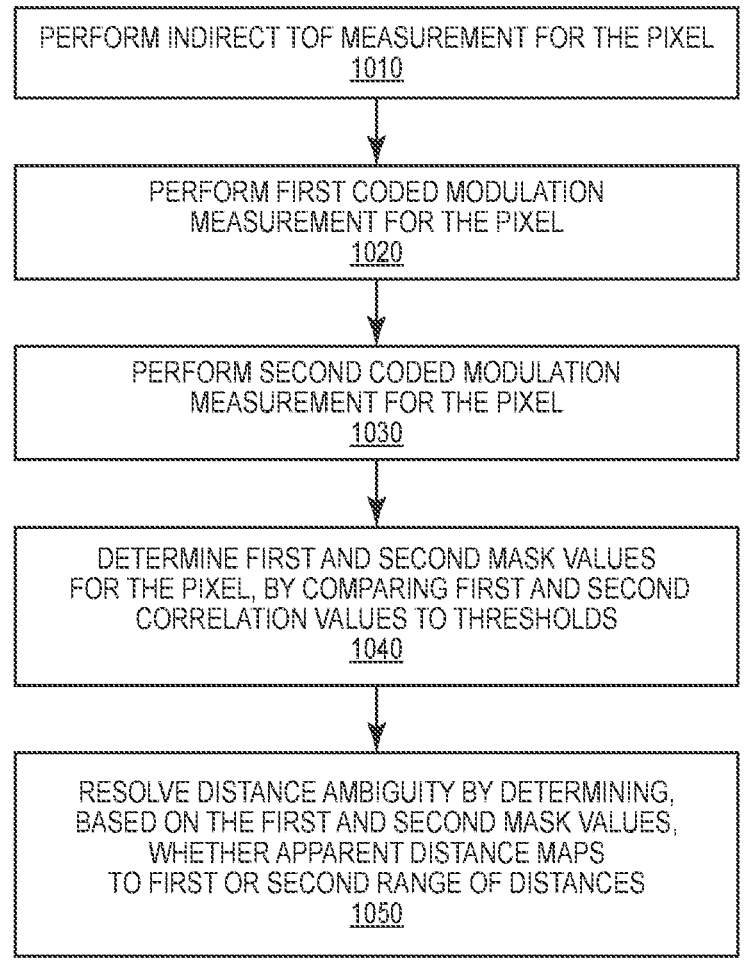
FIG. 10 is a process flow diagram illustrating an example method according to some of the disclosed embodiments.

With the above explanations and detailed examples in mind, it will be appreciated that FIG. 10 is a process flow diagram illustrating an example method for performing depth measurements with an image sensor. As illustrated, the method applies to a single pixel, such as a PMD like those described above. However, it will be appreciated that the same technique can be applied to each of several (or many) pixels in an image sensor, and/or to pixels of different types.

As shown at block 1010, the method includes the step of performing an indirect ToF measurement for the pixel, to obtain a value indicative of an apparent distance. (This value may be the apparent distance itself, or some other value that indicates the apparent distance.) This may comprise CW phase measurements, as discussed above, in some embodiments, and may more particularly comprise four continuous-wave phase measurements for the pixel, using reference signals for the four continuous-wave phase measurements having phase differences (relative to a signal modulating light emitted towards the imaged object or scene) that differ from one another.

As shown at blocks 1020 and 1030, the method further includes performing a first coded-modulation measurement for the first pixel to obtain a first correlation value, using a first combination of modulation code and reference signal selected to yield a first correlation response with a peak extending over a first range of distances to imaged objects, and performing a second coded-modulation measurement for the first pixel to obtain a second correlation value, using a second combination of modulation code and reference signal selected to yield a second correlation response with a peak extending over at least a second range of distances to imaged objects. The first and second combinations of modulation code and reference signal are selected so that the second range of distances abuts the first range of distances so that the correlation peak for the second modulation code overlaps the correlation peak for the first code in an overlap region consisting of a portion of the first range of distances and an adjoining portion of the second range of distances. These combinations of modulation code may be based on pseudorandom sequences, for example, such as a Barker code or m-sequence. They may be based on different codes or sequences, in some embodiments, or on cyclically shifted versions of the same code or sequence, in others. Note that while FIG. 10 suggests that the first and second-coded modulation measurements shown at blocks 1020 and 1030 are performed after the indirect ToF measurement shown at block 1030, these measurements may be performed in any order. In fact, the coded-modulation measurements might be interleaved with CW phase measurements used to obtain the indirect ToF measurement, in some embodiments.

As shown at block 1040, the method of FIG. 10 further includes determining a first mask value for the first pixel by comparing the first correlation value to a first threshold and determining a second mask value for the first pixel by comparing the second correlation value to a second threshold. The first and second thresholds may be the same, or different, in various embodiments.

As shown at block 1050, the method still further includes the step of resolving distance ambiguity in the value indicative of the apparent distance by determining, based on the first and second mask value values, whether the value indicative of the apparent distance corresponds to an actual distance within the first range of distances or within the second range of distances.

The details of determining whether the apparent distance maps to an actual distance within the first range of distances or within the second range of distances may vary somewhat, depending on whether the correlation responses corresponding to the first and second coded-modulation measurements have positive-going or negative-going peaks. (Note that either can be obtained using a PMD like that shown in Figure, depending on which direction is used to obtain the differential measurement from the readout diodes A and B.) When the peaks of the first and second correlation responses have maximum values that are negative, determining whether the value indicative of the apparent distance corresponds to an actual distance within the first range of distances or within the second range of distances may comprise mapping the value indicative of the apparent distance to the first range of distances in the event that the first mask value indicates that the first correlation value is below the first threshold and the second mask value indicates that the second correlation value is above the second threshold, and mapping the value indicative of the apparent distance to the second range of distances in the event that the first mask value indicates that the first correlation value is above the first threshold and the second mask value indicates that the second correlation value is below the second threshold. On the other hand, when the peaks of the first and second correlation responses have maximum values that are negative, determining whether the value indicative of the apparent distance corresponds to an actual distance within the first range of distances or within the second range of distances may comprise mapping the value indicative of the apparent distance to the first range of distances in the event that the first mask value indicates that the first correlation value is above the first threshold and the second mask value indicates that the second correlation value is below the second threshold, and mapping the value indicative of the apparent distance to the second range of distances in the event that the first mask value indicates that the first correlation value is below the first threshold and the second mask value indicates that the second correlation value is above the second threshold.

In either case, determining whether the value indicative of the apparent distance corresponds to an actual distance within the first range of distances or within the second range of distances may comprise, in the event that the first and second mask values indicate that the first and second correlation values both have magnitudes above the respective magnitudes of the first and second thresholds, assigning the value indicative of the apparent distance to the first range of actual distances in the further event that the first correlation value has a magnitude greater than the magnitude of the second correlation value, and otherwise assigning the value indicative of the apparent distance to the second range of actual distances in the further event that the second correlation value has a magnitude greater than the magnitude of the second correlation value.

Alternatively, determining whether the value indicative of the apparent distance corresponds to an actual distance within the first range of distances or within the second range of distances may comprise, in the event that the first and second mask values indicate that the first and second correlation values both have magnitudes above the respective magnitudes of the first and second thresholds, assigning the value indicative of the apparent distance to the first range of actual distances in the further event that a phase value obtained from the one or more continuous-wave phase measurements is between 180 and 360 degrees, and otherwise assigning the value indicative of the distance to the second range of actual distances. In some embodiments, this phase information may be combined with magnitude information from the first and second correlation values to determine how to map the apparent distance to first or second range of actual distances for the case that the first and second correlation values both have magnitudes above the respective magnitudes of the first and second thresholds.

As was discussed in the detailed examples above, performing the indirect time of flight measurement for the pixel may comprise, in some embodiments, measuring a correlation between received light at the pixel and a reference signal, for each of the one or more continuous-wave phase measurements, using a reference signal with a different phase difference, relative to a waveform modulating emitted light illuminating an object of interest, for each of the one or more continuous-wave phase measurements. In some embodiments, performing the indirect time of flight measurement comprises performing four continuous-wave phase measurements for the pixel, the reference signals for the four continuous-wave phase measurements having phase differences (relative to the respective modulation signal) differing from one another, e.g., by 90 degrees. Variations of this approach may be used, e.g., where a non-continuous modulation signal is used for each of the phase measurements.

Likewise, performing the first or second coded-modulation measurement (or both) for the pixel may comprise, in some embodiments, measuring a correlation between received light at the pixel and a first reference signal, using a first reference signal having a cross-correlation function, relative to a waveform that modulates emitted light illuminating an object of interest, having only a single peak with a magnitude exceeding the magnitude of the first threshold, over a range of distances substantially greater than an ambiguity distance for the indirect ToF measurement. In some embodiments, the reference signal and/or the modulating signal may be or be based on a Barker code or an m-sequence, although other codes/waveforms may be used. In some embodiments, the second coded-modulation measurement uses a reference signal that is a cyclically rotated version of the reference signal used for the first coded-modulation measurement.

Still other variations of the technique shown in FIG. 10 are possible. For instance, the threshold values used to obtain the mask values may be dynamically set, in some embodiments. In some embodiments, for example, one or both of the first and second threshold values may be based on a reflectively parameter or intensity parameter for the imaged object or scene. This parameter may be derived from previous measurements made using the pixel of interest or some group of pixels, and/or may be derived from the measurements performed to obtain the indirect ToF measurement.

In view of the detailed examples provided above, it will be appreciated that the presently disclosed techniques may be applied to several image processing applications, to obtain one or more advantages. For example, for applications that require close range Time-of-Flight sensing, the techniques disclosed herein can be used to remove depth measurements that do not belong to the intended measurement range. These techniques may be employed, for instance, in front-facing smartphone cameras or gesture recognition systems.

Other applications include privacy imaging. The techniques employed are similar to those used to remove distance ambiguities, but where the resulting depth image/3D point cloud is used to remove information from a color camera stream, where the color camera is mounted next to the ToF sensor. Such an approach may be used, for example, in a video chat application for smartphones, where the ToF sensor is mounted front-facing next to the color camera. The background can then be removed, using a mask generated according to the presently disclosed techniques, to protect the privacy of the user by not showing details of his surroundings.

The techniques, of course, may also be used to eliminate erroneous measurements caused by the phase-wrapping discussed above. This is particularly useful for long to mid-range applications, such as 3D scanning. By using the mask values obtained from the coded-modulation measurements as guidance, it is possible to determine to which period sensed depth values belong. In some embodiments, the shape and/or position of the peak of one or both of the coded-modulation measurements might be adapted to the scene in order to provide the best phase-unwrapping performance.

Other applications of the presently disclosed techniques are also possible.

Figure 11:
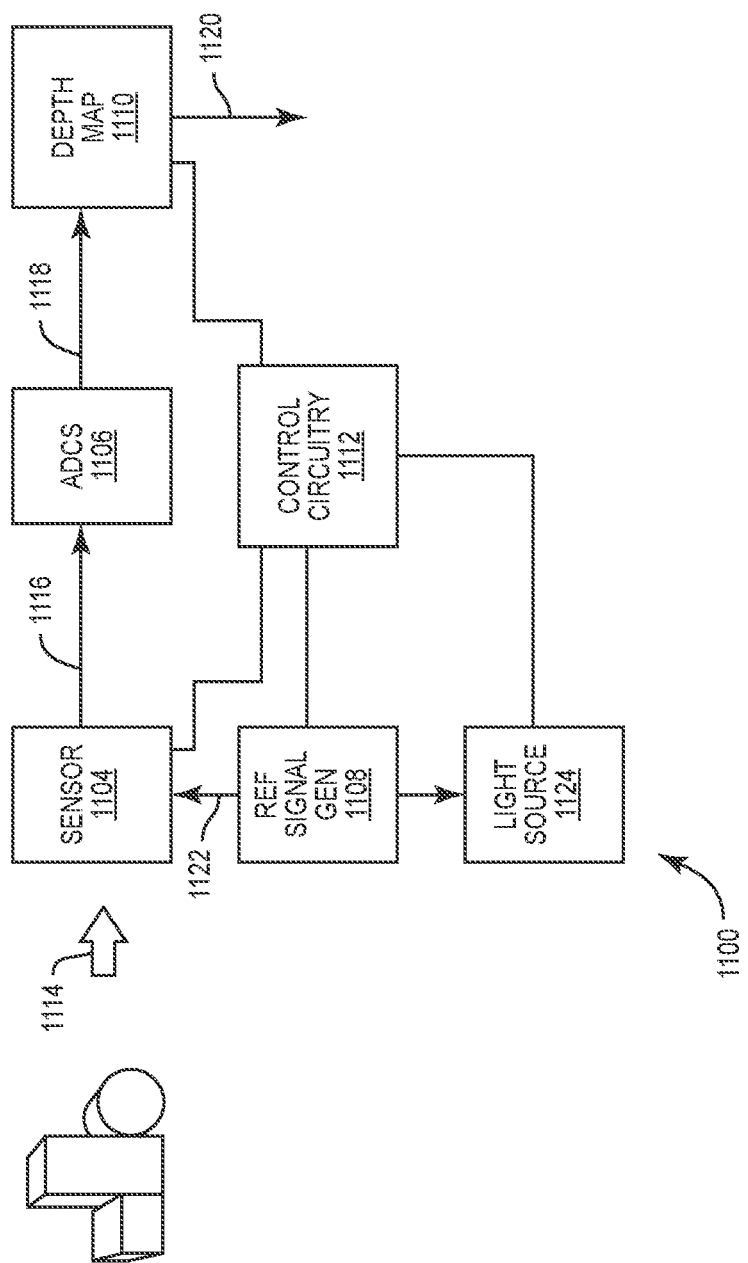
FIG. 11 is a block diagram illustrating components of an example image processing system, according to some embodiments.

FIG. 11, correspondingly, illustrates an example image processing system 1100, according to several embodiments of the presently disclosed devices and systems. The system 1100 can be utilized to detect objects, e.g., as shown in target scene 1102, as well as to determine distances to the detected objects.

The illustrated system 1100 includes a light source 1124, which is configured to amplitude modulate a beam of light and emit the amplitude-modulated light towards the scene 1102. The amplitude modulation may be based on a reference signal generated by reference signal generator 1108. For continuous-wave time-of-flight or other indirect ToF measurements, the reference signal may be a radio-frequency (RF) signal, e.g., in the MHz range, although other modulation frequencies can be used. For coded-modulation measurements, the reference signal may be a code sequence, such as an m-sequence. The emitted light can include light having varied ranges of wavelength, such as sunlight and infra-red. The emitted light reflects from one or more objects in the scene and returns to the sensor 1104.

The illustrated image processing system 1100 in FIG. 11 further includes a sensor 1104, which comprises a plurality of pixels configured to generate a respective plurality of pixel signal values in response to received light 1114, where each pixel is configured to obtain its respective pixel signal value by demodulating received light using a reference signal 1122. As seen in FIG. 11, received light 1102 may be reflected from a target scene 1102. As discussed above, while several suitable pixel configurations are possible, one suitable pixel design is the PMD described above.

The numbers of pixels, rows, and columns can vary, from one embodiment to another, and are selected based on factors including desired resolution, intensity, and the like. In one example, these sensor characteristics are selected based on the objects to be detected and the expected distances to the objects. Thus, for example, the pixel resolution of the pixels in sensor 1104 may vary, from one embodiment to another. Small objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

Image processing system 1100 further includes a reference signal generator 1108, which may be configured, for example, to generate a reference signal 1122 with a selectable phase, relative to the phase of a modulation signal applied to light transmitted towards target scene 1102, and to provide the reference signal 1122 to the plurality of pixels in sensor 1104. The reference signal generator 1108 may be further configured to generate a code-modulation reference signal, which may take the form of an m-sequence or Barker code, for example, and provide the reference signal 1122 to the plurality of pixels in sensor 1104 for code-modulation measurements. Image processing system 1100 still further includes an analog-to-digital converter (ADC) circuit 1106, which may include one or several ADCs, operatively coupled to the plurality of pixels in sensor 1104.

The illustrated image processing system 1100 further includes control circuitry 1112, which may comprise, for example a processor, controller, or the like, and/or other digital logic. As seen in the figure, the control circuitry 1112 may control the operation of the reference signal generator 1108, the sensors 1104, and the light source 1124. The control circuitry 1112 is further configured to control the generation and use of an output such as a depth map 1110, a 3D point cloud, etc. In several embodiments, the control circuitry 1112 is configured to cause the image processing system 1100 to carry out a method like any of those described above in connection with FIG. 10.

Thus, for example, control circuity 1112 in some embodiments may be configured to control the reference signal generator 1108 and the plurality of pixels in sensor 1104 to perform an indirect ToF measurement using the pixel, to obtain a value indicative of an apparent distance to an imaged object or scene, and to perform first and second coded-modulation measurements for the pixel, to obtain first and second correlation values, respectively, using respective first and second combinations of modulation code and reference signal. The first and second combinations of modulation code and reference signal may be selected to yield a first correlation response with a peak extending over a first range of distances to imaged objects and a second correlation response with a peak extending over a second range of distances to imaged objects, where the first and second ranges of distances abut one another and where the first and second correlation peaks overlap in an overlap region consisting of a portion of the first range of distances and an adjoining portion of the second range of distances. The control circuitry 1112 in these embodiments may be further configured to determine a first mask value for the pixel by comparing the first correlation value to a first threshold and determine a second mask value for the pixel by comparing the second correlation value to a second threshold. Finally, the control circuitry 1112 may be configured to resolve distance ambiguity in the value indicative of the apparent distance by determining, based on the first and second mask value values, whether the value indicative of the apparent distance corresponds to an actual distance within the first range of distances or within the second range of distances. Any of the variations discussed above for the method shown in FIG. 10 may be applied to the apparatus of FIG. 11, in various embodiments.

In view of the detailed discussion above, it will be appreciated that the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for performing depth measurements with an image sensor, the method comprising, for each of at least one pixel:
   performing an indirect time-of-flight measurement using the pixel, to obtain a value indicative of an apparent distance to an imaged object or scene;
   performing a first coded-modulation measurement for the pixel to obtain a first correlation value, using a first combination of modulation code and reference signal selected to yield a first correlation response with a peak extending over a first range of distances to imaged objects;
   performing a second coded-modulation measurement for the pixel to obtain a second correlation value, using a second combination of modulation code and reference signal selected to yield a second correlation response with a peak extending over at least a second range of distances to imaged objects, the second range of distances abutting the first range of distances, wherein the correlation peak for the second modulation code overlaps the correlation peak for the first code in an overlap region consisting of a portion of the first range of distances and an adjoining portion of the second range of distances;
   determining a first mask value for the pixel by comparing the first correlation value to a first threshold and determining a second mask value for the pixel by comparing the second correlation value to a second threshold; and
   resolving distance ambiguity in the value indicative of the apparent distance by determining, based on the first and second mask value values, whether the value indicative of the apparent distance corresponds to an actual distance within the first range of distances or within the second range of distances.

2. The method of claim 1, wherein the peaks of the first and second correlation responses have maximum values that are negative and wherein determining whether the value indicative of the apparent distance corresponds to an actual distance within the first range of distances or within the second range of distances comprises:
   mapping the value indicative of the apparent distance to the first range of distances in the event that the first mask value indicates that the first correlation value is below the first threshold and the second mask value indicates that the second correlation value is above the second threshold; and
   mapping the value indicative of the apparent distance to the second range of distances in the event that the first mask value indicates that the first correlation value is above the first threshold and the second mask value indicates that the second correlation value is below the second threshold.

3. The method of claim 2, wherein determining whether the value indicative of the apparent distance corresponds to an actual distance within the first range of distances or within the second range of distances further comprises, in the event that the first and second mask values indicate that the first and second correlation values both have magnitudes above the respective magnitudes of the first and second thresholds:
   assigning the value indicative of the apparent distance to the first range of actual distances in the further event that the first correlation value has a magnitude greater than the magnitude of the second correlation value; and
   otherwise assigning the value indicative of the apparent distance to the second range of actual distances in the further event that the second correlation value has a magnitude greater than the magnitude of the second correlation value.

4. The method of claim 2, wherein the indirect time-of-flight measurement is a continuous-wave time-of flight measurement, and wherein determining whether the value indicative of the apparent distance corresponds to an actual distance within the first range of distances or within the second range of distances further comprises, in the event that the first and second mask values indicate that the first and second correlation values both have magnitudes above the respective magnitudes of the first and second thresholds:
   assigning the value indicative of the apparent distance to the first range of actual distances in the further event that a phase value obtained from the continuous-wave time-of-flight measurement is between 180 and 360 degrees, and otherwise assigning the value indicative of the distance to the second range of actual distances.

5. The method of claim 1, wherein the peaks of the first and second correlation responses have maximum values that are negative and wherein determining whether the value indicative of the apparent distance corresponds to an actual distance within the first range of distances or within the second range of distances comprises:
   mapping the value indicative of the apparent distance to the first range of distances in the event that the first mask value indicates that the first correlation value is above the first threshold and the second mask value indicates that the second correlation value is below the second threshold; and
   mapping the value indicative of the apparent distance to the second range of distances in the event that the first mask value indicates that the first correlation value is below the first threshold and the second mask value indicates that the second correlation value is above the second threshold.

6. The method of claim 5, wherein determining whether the value indicative of the apparent distance corresponds to an actual distance within the first range of distances or within the second range of distances further comprises, in the event that the first and second mask values indicate that the first and second correlation values both have magnitudes above the respective magnitudes of the first and second thresholds:
   assigning the value indicative of the apparent distance to the first range of actual distances in the further event that the first correlation value has a magnitude greater than the magnitude of the second correlation value; and
   otherwise assigning the value indicative of the apparent distance to the second range of actual distances in the further event that the second correlation value has a magnitude greater than the magnitude of the second correlation value.

7. The method of claim 5, wherein the indirect time-of-flight measurement is a continuous-wave time-of flight measurement, and wherein determining whether the value indicative of the apparent distance corresponds to an actual distance within the first range of distances or within the second range of distances further comprises, in the event that the first and second mask values indicate that the first and second correlation values both have magnitudes above the respective magnitudes of the first and second thresholds:
assigning the value indicative of the apparent distance to the first range of actual distances in the further event that a phase value obtained from the continuous-wave time-of-flight measurement is between 180 and 360 degrees, and otherwise assigning the value indicative of the distance to the second range of actual distances.

8. The method of claim 1, wherein the indirect time-of-flight measurement is a continuous-wave time-of-flight measurement comprising one or more continuous-wave phase measurements, and wherein performing the continuous-wave time-of-flight measurement for the pixel comprises:
measuring a correlation between received light at the pixel and a reference signal, for each of one or more continuous-wave phase measurements, using a reference signal with a different phase difference, relative to a waveform modulating emitted light illuminating an object of interest, for each of the one or more continuous-wave phase measurements.

9. The method of claim 8, wherein performing the continuous-wave time-of-flight measurement comprises performing four continuous-wave phase measurements for the pixel, the reference signals for the four continuous-wave phase measurements having phase differences differing from one another.

10. The method of claim 1, wherein performing the first coded-modulation measurement for the pixel comprises:
measuring a correlation between received light at the pixel and a first reference signal, using a first reference signal having a cross-correlation function, relative to a waveform that modulates emitted light illuminating an object of interest, having only a single peak with a magnitude exceeding the magnitude of the first threshold, over a range of distances substantially greater than an ambiguity distance for the indirect time-of-flight measurement.

11. The method of claim 10, wherein the first reference signal is a Barker code or an m-sequence.

12. The method of claim 11, wherein the second coded-modulation measurement uses a second reference signal that is a cyclically rotated version of the first reference signal.

13. The method of claim 1, wherein one or both of the first and second threshold values is based on a reflectivity parameter for the imaged object or scene.

14. An image processing system comprising:
a sensor comprising a plurality of pixels configured to generate a respective plurality of pixel signal values in response to received light, wherein each pixel is configured to obtain its respective pixel signal value by demodulating received light using a reference signal;
a reference signal generator configured to generate a reference signal and to provide the reference signal to the plurality of pixels, and control circuitry configured to control the reference signal generator and the plurality of pixels to, for each of at least one pixel:
perform an indirect time-of-flight measurement using the pixel, to obtain a value indicative of an apparent distance to an imaged object or scene;
perform a first coded-modulation measurement for the pixel to obtain a first correlation value, using a first combination of modulation code and reference signal selected to yield a first correlation response with a peak extending over a first range of distances to imaged objects;
perform a second coded-modulation measurement for the pixel to obtain a second correlation value, using a second combination of modulation code and reference signal selected to yield a second correlation response with a peak extending over at least a second range of distances to imaged objects, the second range of distances abutting the first range of distances, wherein the correlation peak for the second modulation code overlaps the correlation peak for the first code in an overlap region consisting of a portion of the first range of distances and an adjoining portion of the second range of distances;
determine a first mask value for the pixel by comparing the first correlation value to a first threshold and determine a second mask value for the pixel by comparing the second correlation value to a second threshold; and
resolve distance ambiguity in the value indicative of the apparent distance by determining, based on the first and second mask value values, whether the value indicative of the apparent distance corresponds to an actual distance within the first range of distances or within the second range of distances.

15. The image processing system of claim 14, wherein the peaks of the first and second correlation responses have maximum values that are negative and wherein the control circuitry is configured to determine whether the value indicative of the apparent distance corresponds to an actual distance within the first range of distances or within the second range of distances by:
mapping the value indicative of the apparent distance to the first range of distances in the event that the first mask value indicates that the first correlation value is below the first threshold and the second mask value indicates that the second correlation value is above the second threshold; and
mapping the value indicative of the apparent distance to the second range of distances in the event that the first mask value indicates that the first correlation value is above the first threshold and the second mask value indicates that the second correlation value is below the second threshold.

16. The image processing system of claim 15, wherein the control circuitry is configured to determine whether the value indicative of the apparent distance corresponds to an actual distance within the first range of distances or within the second range of distances by, in the event that the first and second mask values indicate that the first and second correlation values both have magnitudes above the respective magnitudes of the first and second thresholds:
assigning the value indicative of the apparent distance to the first range of actual distances in the further event that the first correlation value has a magnitude greater than the magnitude of the second correlation value; and
otherwise assigning the value indicative of the apparent distance to the second range of actual distances in the further event that the second correlation value has a magnitude greater than the magnitude of the second correlation value.

17. The image processing system of claim 15, wherein the indirect time-of-flight measurement is a continuous-wave time-of-flight measurement and wherein the control circuitry is configured to determine whether the value indicative of the apparent distance corresponds to an actual distance within the first range of distances or within the second range of distances by, in the event that the first and second mask values indicate that the first and second correlation values both have magnitudes above the respective magnitudes of the first and second thresholds:

assigning the value indicative of the apparent distance to the first range of actual distances in the further event that a phase value obtained from the continuous-wave time-of-flight measurement is between 180 and 360 degrees, and otherwise assigning the value indicative of the distance to the second range of actual distances.

18. The image processing system of claim 14, wherein the peaks of the first and second correlation responses have maximum values that are negative and wherein the control circuitry is configured to determine whether the value indicative of the apparent distance corresponds to an actual distance within the first range of distances or within the second range of distances by:

mapping the value indicative of the apparent distance to the first range of distances in the event that the first mask value indicates that the first correlation value is above the first threshold and the second mask value indicates that the second correlation value is below the second threshold; and mapping the value indicative of the apparent distance to the second range of distances in the event that the first mask value indicates that the first correlation value is below the first threshold and the second mask value indicates that the second correlation value is above the second threshold.

19. The image processing system of claim 18, wherein the control circuitry is configured to determine whether the value indicative of the apparent distance corresponds to an actual distance within the first range of distances or within the second range of distances by, in the event that the first and second mask values indicate that the first and second correlation values both have magnitudes above the respective magnitudes of the first and second thresholds:

assigning the value indicative of the apparent distance to the first range of actual distances in the further event that the first correlation value has a magnitude greater than the magnitude of the second correlation value; and otherwise assigning the value indicative of the apparent distance to the second range of actual distances in the further event that the second correlation value has a magnitude greater than the magnitude of the second correlation value.

20. The image processing system of claim 18, wherein the indirect time-of-flight measurement is a continuous-wave time-of-flight measurement and wherein the control circuitry is configured to determine whether the value indicative of the apparent distance corresponds to an actual distance within the first range of distances or within the second range of distances by, in the event that the first and second mask values indicate that the first and second correlation values both have magnitudes above the respective magnitudes of the first and second thresholds:

assigning the value indicative of the apparent distance to the first range of actual distances in the further event that a phase value obtained from the continuous-wave time-of-flight measurement is between 180 and 360 degrees, and otherwise assigning the value indicative of the distance to the second range of actual distances.

21. The image processing system of claim 14, wherein the indirect time-of-flight measurement is a continuous-wave time-of-flight measurement and the control circuitry is configured to perform the continuous-wave time-of-flight measurement for the pixel by:

measuring a correlation between received light at the pixel and a reference signal, for each of one or more continuous-wave phase measurements, using a reference signal with a different phase difference, relative to a waveform modulating emitted light illuminating an object of interest, for each of the one or more continuous-wave phase measurements.

22. The image processing system of claim 21, wherein the control circuitry is configured to perform the continuous-wave time-of-flight measurement by performing four continuous-wave phase measurements for the pixel, the reference signals for the four continuous-wave phase measurements having phase differences differing from one another.

23. The image processing system of claim 14, wherein the control circuitry is configured to perform the first coded-modulation measurement for the pixel by:

measuring a correlation between received light at the pixel and a first reference signal, using a first reference signal having a cross-correlation function, relative to a waveform that modulates emitted light illuminating an object of interest, having only a single peak with a magnitude exceeding the magnitude of the first threshold, over a range of distances substantially greater than an ambiguity distance for the indirect time-of-flight measurement.

24. The image processing system of claim 23, wherein the first reference signal is a Barker code or an m-sequence.

25. The image processing system of claim 24, wherein the second coded-modulation measurement uses a second reference signal that is a cyclically rotated version of the first reference signal.

26. The image processing system of claim 14, wherein the control circuitry is configured to determine one or both of the first and second threshold values based on a reflectivity parameter for the imaged object or scene.

* * * * *

UNITED STATES PATENT AND TRADEMARK OFFICE
CERTIFICATE OF CORRECTION

| | |
|---|---|
| PATENT NO. | : 11,668,829 B2 |
| APPLICATION NO. | : 16/356893 |
| DATED | : June 6, 2023 |
| INVENTOR(S) | : A. Schoenlieb et al. |

It is certified that error appears in the above-identified patent and that said Letters Patent is hereby corrected as shown below:

In the Claims

Column 20, Line 64 (Claim 7, Line 2) please change "time-of flight" to -- time-of-flight --

Column 22, Line 20 (Claim 14, Line 40) please change "mask value values" to -- mask values --

Signed and Sealed this
Twenty-second Day of August, 2023

*Katherine Kelly Vidal*

Katherine Kelly Vidal
*Director of the United States Patent and Trademark Office*